(12) United States Patent
Romanov et al.

(10) Patent No.: US 6,245,718 B1
(45) Date of Patent: Jun. 12, 2001

(54) COMPOSITE MATERIAL FOR ANTIFRICTION WORKPIECES

(75) Inventors: Serhey M. Romanov; Dmitriy Romanov, both of Alexandria, VA (US)

(73) Assignee: Bearing Sliding Inc., Alexandria, VA (US)

( * ) Notice: Subject to any disclaimer, the term of this patent is extended or adjusted under 35 U.S.C. 154(b) by 0 days.

(21) Appl. No.: 09/562,327

(22) Filed: May 1, 2000

(51) Int. Cl.$^7$ ................ C10M 103/02; C22C 33/02
(52) U.S. Cl. .............. 508/105; 508/103; 508/123
(58) Field of Search ....................... 508/103, 104, 508/105, 100, 113, 123

(56) References Cited

U.S. PATENT DOCUMENTS

| | | | |
|---|---|---|---|
| 3,623,981 | * 11/1971 | Bordon et al. | 508/105 |
| 3,956,146 | * 5/1976 | Tsuya et al. | 508/103 |
| 4,425,247 | * 1/1984 | Bely et al. | 508/105 |
| 5,744,433 | * 4/1998 | Storstrom et al. | 508/103 |

* cited by examiner

Primary Examiner—Jacqueline V. Howard
(74) Attorney, Agent, or Firm—Armstrong, Westerman, Hattori, McLeland & Naughton, LLP

(57) ABSTRACT

A material having improved hardness characteristics and bearing, lower friction coefficient and increased service life in clusters of sliding friction contains powder of copper, iron, phosphorus, graphite, dust of disulphide of molybdenum and steel substrate made out of low carbohydrate steel. The material has a bimetal structure with granules inserted in a matrix. The material of the invention is especially useful in the machine-building industry, particularly for the production of blocks for units of sliding friction in machines, mechanisms and equipment.

9 Claims, 2 Drawing Sheets

DEPENDENCE OF ENDURANCE CHARACTERISTICS AND ELECTRICAL CONDUCTIVITY
OF THE MATERIAL ON THE SHARE OF GRANULES AND FREE GRAPHITE
AS MATERIAL COMPONENTS

Fig.2

COMPARATIVE AVERAGE CONSTANT OF FRICTION AND WEAR RATE

| COMPONENT CONTENT MASS % | | | | | | | | | GRANULA SIZE | AVERAGE CONSTANT OF FRICTION | | | WEAR RATE, mkm/mm HOUR | | |
|---|---|---|---|---|---|---|---|---|---|---|---|---|---|---|---|
| Zn | Fe | P | C | | Cu | | MOLYBDENUM DISULFIDE | | | LOADING P, H | | | LOADING P, H | | |
| | | | TOTAL | INCLUDING GRANULAS | TOTAL | INCLUDING GRANULAS | TOTAL | INCLUDING GRANULAS | | 29.4 | 53.9 | 122.5 | 29.4 | 53.9 | 122.5 |
| 12 | 10 | 0.8 | 20 | 14.5 | 57 | 10 | - | - | 0.4-2.0 | 0.1 | 0.11 | 0.13 | 0.2 | 0.24 | 0.28 |
| PROTOTYPE | | | | | | | | | | | | | | | |
| - | 15 | 0.9 | 18 | 14 | 61.6 | 4.5 | 4.5 | 4.5 | 0.4-0.8 | 0.09 | 0.09 | 0.1 | 0.1 | 0.12 | 0.14 |
| - | 20 | 1.2 | 20 | 16 | 54.3 | 4.5 | 4.5 | 4.5 | 0.4-0.8 | 0.04 | 0.05 | 0.06 | 0.012 | 0.14 | 0.16 |
| - | 20 | 1.2 | 20 | 16 | 54.3 | 4.5 | 4.5 | 4.5 | 0.8-1.0 | 0.07 | 0.08 | 0.1 | 0.16 | 0.19 | 0.21 |
| - | 15 | 0.9 | 20 | 16 | 54.3 | 4.5 | 4.5 | 4.5 | 0.8-1.0 | 0.05 | 0.06 | 0.07 | 0.15 | 0.16 | 0.18 |

COMPOSITE MATERIAL FOR ANTIFRICTION WORKPIECES

BACKGROUND OF THE INVENTION

The invention concerns the field of antifriction materials produced using a method of powder metallurgy, and can be applied to the machine-building industry to produce units of sliding friction for various machines, mechanisms and equipment.

The properties of existing antifriction materials have proved to be insufficient to ensure a satisfactory service life between maintenance and repairs of machines, mechanisms and equipment.

A patent on rolling of metal powder was issued in 1902, however, only after 35–40 years did it start to be practically applied. During World War II, by means of rolling of iron powder, guiding slides for artillery shells were produced in Germany. Herhard Nezer reported this in the fourth International Congress of Engineers and Mechanics in 1952 in Stockholm [1]. After that report, development of a method of rolling of powder began in USA and it was first applied in nuclear engineering. H.Hauzner and S. Stockheim Sylvania Co. (USA) initiated production of metal-cermets rolling from powder of thorium, uranium and plutonium, powder of tungsten and mixture of tungsten with a dioxide of uranium. Then, roll stock out of steel powder was manufactured by other corporations that worked in the field of nuclear fuel, such as Whitecker Metals Corporation, Glen Martin Company and others [1].

In the following years in the USA, after introduction of special rolling mills, industrial application of rolling of powder expanded. Production of tape and leaves out of black and color materials powder began in the USA by Hiden Metals Company, which in 1959 introduced semi-industrial mechanisms for rolling copper and other metals powder [1].

Bliss (Ohice) Company mastered production of a commodity copper tape, which was cheaper comparing to alloyed tape.

In 1959, the Republic Steel Co. disclosed the completion of development of technological process of continuous rolling of iron powder. In England, Mond Nickel company rolled out of nickel-ferrous powder honeycombless leaves 0.25 mm thick and up to 300 mm long. Industrial production of leaves out of titanium powder was also initiated [1].

The technology of producing various types of powder rolling products including liners of blocks of bimetallic and multi-layer roll stock, has been developed more recently.

Antifriction two-layer materials on steel substrate with babbitt by a working stratum (babbit is soldered onto the steel substrate, the substrate being one of the layers) are known [2]. These materials have found wide application in modern engines and in bearings of liquid friction.

Deficiencies of these materials are a low fatigue resistance of 1,13 kg/mm, origin of scores (mechanical damages) at the moment of starting and hitch at termination of feeding of liquid lubricant, as the babbitt works only at plentiful liquid lubricant and low speeds of slide.

Also known are materials in which a layer of mixture of powder, for example a layer of babbitt of about 75 microns thick, is baked on a steel substrate [2]. This triple material (the mixture of copper and nickel powders is soldered onto the steel substrate, then it is saturated with babbitt, the substrate being one of these layers) has found broad application since 1940 in the USA for crankshafts and crankshaft rod bushings of automobile and air engines and diesel engines. It works with loadings 15–20% higher than the best babbitt containing tin and lead. Design load for this material is 140 kg/cm$^2$.

Deficiencies of this material are its high cost, low fatigue resistance, low unit loads, operation only at plentiful liquid lubricant, origin of scores at termination of feeding of liquid lubricant, impossibility to produce blocks weighing over 15 kg.

Another material is known [2] which comprises a steel substrate and a layer of lead-containing bronze, with the following relation of components, in mass %:

| | |
|---|---|
| Lead | 10–40 |
| Tin | 0–10 |
| Copper | rest |

Deficiencies of this material are its high cost, the fact that it contains lead, which increases harmful substances in air and is a ground of pollution during manufacture and maintenance, and its low mechanical strength, as lead reduces temperature of baking to 820° C. because it evaporates intensively at a higher temperature, so that it sharply reduces the hardness of bronze and, consequently, its endurance. Since copper and lead are almost non-soluble in each other, the material has a two-phase structure consisting of grains of lead and copper; therefore the bronze stratum of a bimetal has a low mechanical strength. Moreover, the working surface lead-containing bronze does not immerse deposited solid particles, so that it requires a high scale of purifying lubricant oil or lamination on the working surface of an alloy lead and tin or lead and indium, which sharply increases the cost of material, and pollutes the environment.

Other materials are known which comprise a steel substrate and a porous stratum baked and permeated with fluorocarbon filling [2]. These materials have high mechanical strength, thermal conduction and bearing capacity. Materials of this type, operating with a lack of lubricant, are permeated with fluorocarbon filling (lead and disulphide of a molybdenum) or, for operation with minimum lubricant, are permeated with acetate-copolymer.

Deficiencies of these materials are the high friction coefficient of 0.13, and consequently, insufficient resistance, high complexity and cost, impossibility to manufacture blocks weighing over 15 kg.

Other materials are known which comprise a steel substrate and a layer of powder of granules of spherical tin bronze containing 0–10 units of bronze, with subsequent sealing [2].

Deficiencies of these materials are low mechanical and hydrodynamic hardness, as the tin reduces temperature of baking to 780° C. since it evaporates intensively at higher temperatures, and consequently, the hardness of bronze and its endurance are sharply reduced. The tin bronze cannot be utilized for operation in heavy-loaded clusters. The manufacture of blocks weighing over 15 kg is impossible.

Other materials are known which comprise a steel substrate and a layer of powder of bronze graphite containing 8-4 (stannic-graphite bronze with the mass % content of bronze and graphite: bronze-8 mass %, graphite-4 mass %), 9-3 and 10-3 of bronze [3]. The content of graphite in these materials makes 3–4% of total mass.

Deficiencies of these materials are the low graphite content below 4,5%; at such content, it cannot create a separating skin on the surface of the material, which causes higher wear of the contacting pairs.

Further, antifriction materials are known which contain zinc. For example, the proportions of the components of such a material [4] are as follows, in mass %:

| | |
|---|---|
| Zinc | 8.0 |
| Iron | 4.5 |
| Lead | 3.0 |
| Graphite | 6.0 |
| Quartz | 4.0 |
| Disulphide of molybdenum | 6.0 |
| Copper | Rest |

Deficiencies of this material are its low hardness, as lead reduces temperature of baking to 820° C., the content of free graphite over 5% which sharply weakens the material, the presence of lead which increases the content of harmful substances in air and a ground during manufacture and maintenance.

At temperature over 550° C., zinc evaporates sharply, which weakens the material. As a result this material does not have sufficient hardness and endurance.

Other antifriction materials are known [5], in which the composition is the following, in mass %:

| | |
|---|---|
| Carbon | 1–5 |
| Copper sulfides | 1–10 |
| Alloy Fe—Cr | 0.2–5.0 |
| Copper | Rest |

Deficiencies of these materials are poor lubricating properties, high friction coefficient, heightened wear of coupled surfaces in connection with the content in its composition of carbides of chrome and impossibility of manufacturing work pieces weighing over 5 kg.

Another antifriction material is known [6] which comprises a copper basis and has the following composition, in mass %:

| | |
|---|---|
| Iron | 3–6 |
| Graphite | 2–5 |
| Tin | 9–12 |
| Copper | Rest |

Deficiencies of this material are the heightened wear of pairs of abrasion due to an insignificant content of graphite, which, consequently, does not prevent connection between the materials of contacting pair, low mechanical strength, as the tin does not allow to increase temperature of baking over 820° C., which is completely insufficient for manufacturing workpieces weighing over 5 kgs, and high cost due to the presence of expensive and scarce tin.

Another antifriction material on a copper basis is known [7] which contains the following components, in mass %:

| | |
|---|---|
| Graphite | 15–16 |
| Tin | 9–10 |
| Lead | 10–12 |
| Copper | Rest |

Deficiencies of this material are its low mechanical strength due to content of free graphite in the amount over 10% of total mass, which sharply weakens the material, and consequently its low resistance, impossibility of application with high load in heavy operational requirements, presence of lead, which increases the density of harmful substances in air and ground during manufacture and maintenance, and high cost due to content of expensive tin and lead.

Another antifriction material on copper basis is known [8], which contains the following components, in mass %:

| | |
|---|---|
| Iron | 9–18 |
| Fluorides of calcium, selenium, barium | 10–40 |
| Copper | Rest |

Deficiencies of this material are high wear of pairs of abrasion due to lack of graphite, which, consequently, does not prevent connection between materials of contacting pairs and impossibility of contacting pairs weighing over 5 kg.

Finally, another antifriction material is known [9], which contains powder of copper, iron, phosphorus, graphite and zinc at the following proportions, in mass %:

| | |
|---|---|
| Phosphorus | 0.48–1.20 |
| Iron | 9.6–12.0 |
| Zinc | 2.4–16.0 |
| Graphite | 10.5–25.0 |
| Copper | Rest |

In this material, 10–21% of graphite and 9,0–15,0% of copper make up the material as granules having a diameter in the range of 0.4–2.0 mm.

An important deficiency of this material is its low mechanical strength, as zinc does not allow to increase temperature of baking over 820° C. due to intensive evaporation of zinc, whereas, for deriving a material on a copper basis with high mechanical characteristics containing 9.6–12.0% of iron, temperature of baking should not be below 1000° C.

SUMMARY OF THE INVENTION

Improved maintenance of antifriction materials in clusters of sliding friction, especially those heavily massed and at high speeds of slide, requires high volumetric and surface hardness of endurance, low friction coefficient, capability of forming secondary structures, high bearing capacity, high thermal conduction, stable separating skin of solid lubricant formed on contacting surfaces to prevent contraction and wearing out of materials.

Thus, it is desired to produce ecologically clean materials for clusters of sliding friction with high volumetric and surface hardness and endurance, low friction coefficient and forming stable separating skin on contacting surfaces out of solid lubricant, which could prevent surfaces from wearing out. These materials should allow making work pieces weighing from 0.5 to 2000 kg and more.

In other words, an object of the present invention is to make a composite material for antifriction work pieces featuring high mechanical strength, endurance, low friction coefficient, and formation on a surface of a material of separating skin preventing a wear contacting pairs.

The present invention provides an antifriction material made from powder of copper, iron, phosphorus, in which zinc is preferably eliminated, the content of iron is increased, and powder of disulphide of a molybdenum and steel substrate from low-carbohydrate steel are added.

Specifically, according to an aspect of the present invention, an antifriction material is provided which is formed by granules comprising, or, in the alternative, consisting essentially of, graphite, disulphide of molybdenum and copper inserted in a matrix consisting essentially of iron, phosphorus, graphite, and copper. Thus, the material has a bimetal structure.

Preferably, the material of the present invention comprises the following amounts of components, in mass % relative to the mass of the material:

| Phosphorus | about 0.48–1.20 |
|---|---|
| Iron | about 12–20 |
| Disulphide of a molybdenum | about 0–7.5 |
| Graphite | about 10.5–20.0 |
| Copper | Rest |

In the whole specification, the word about followed by a range means from about the lower limit to about the upper limit of the range.

Preferably, the matrix comprises the following amounts of components, in mass % relative to the mass of the matrix:

| Phosphorus | about 0.71–1.44 |
|---|---|
| Iron | about 18.8–25.0 |
| Graphite | about 0.78–5.0 |
| Copper | Rest |

Preferably, the granules contain about 40–70 mass % of graphite, about 15–30 mass % of disulphide of molybdenum, and about 15–30 mass % of copper relative to the mass of the granules.

Advantageously, about 10–16 mass % of graphite, about 0–7.5 mass % of disulphide of molybdenum and about 4.5–12 mass % of copper relative to the mass of the material go into the material as granules. The granule size is preferably in the range of about 0.4–1.6 mm.

The amount of granules in the total composition is preferably in the range of about 6–24 mass %.

An antifriction material according to the present invention is prepared by forming a layer of the material on a steel substrate. Preferably, the width of the steel substrate is in the range of about 1.5–25 mm.

BRIEF DESCRIPTION OF THE DRAWINGS

FIG. 2 is a Table showing the average constant of friction and wear rate of the material according to the present invention.

In FIG. 1A, the curve HB shows the hardness of the material as a function of the content of the granules. The second curve characterizes the specific resistance to the content of granules.

FIG. 1B shows the dependence of structural limit on curving and of structural limit on tension to the content of granules.

FIG. 1C shows the dependence of the structural limit on tension to the content of graphite (entered as a powder).

Figure 1A:
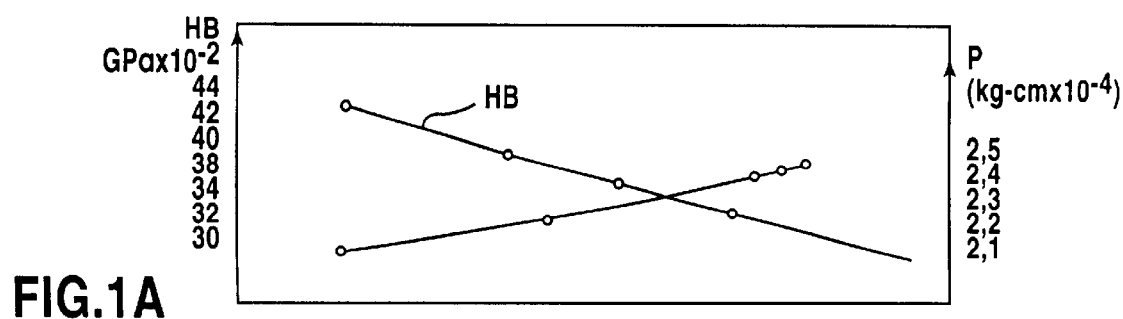
FIGS. 1A, 1B and 1C are graphs representing the endurance characteristics and electrical conductivity of the material according to the invention as a function of the proportion of granules and free graphite.
Figure 1B:
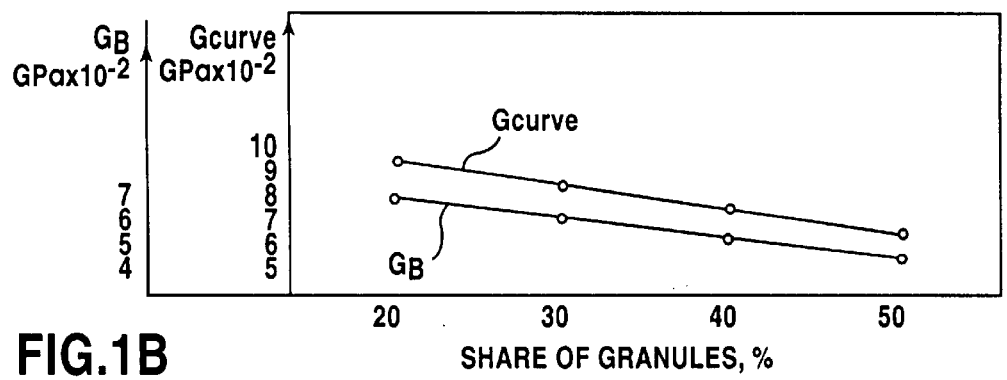
Figure 1C:
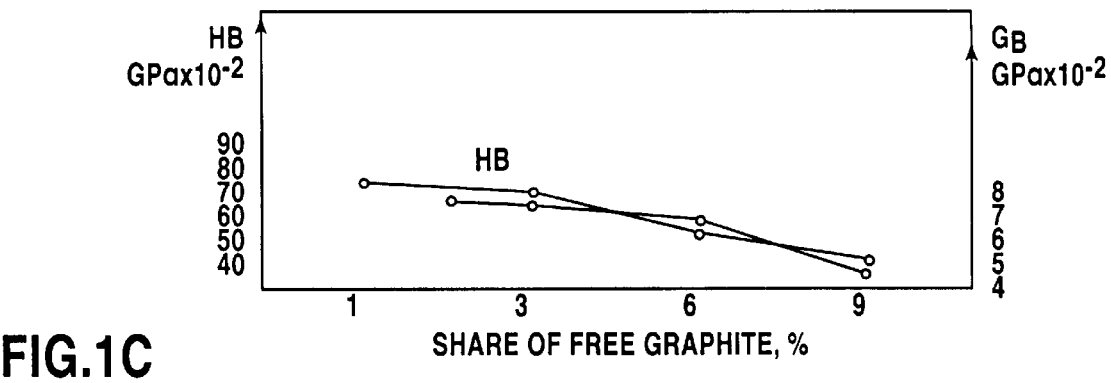

The measuring methods for the tests reported in FIGS. 1A, 1B and 1C were carried out as follows:

1. Hardness was determined on the hardometer TM-2 by the way of indentation of the ball into the material in accordance to GOST 25698-83.
2. Definition of the solidity and plasticity of samples was carried out on tearing machine R10S with the loads of 25 and 50 kN at the loading speed 10N/mm$^2$·s
3. Specific resistance was determined by the calculation method under the formula:

$$\rho = \frac{R \cdot S}{1}$$

where: R-resistance of the material; S-sectional area; l-length
Resistance of the material R was determined with Tester SH4500.

For the test results reported in FIG. 2, friction coefficient and wear were determined on wear-machine SMC-2 using the samples made of bimetal.

Tests were carried out at the following regimes:
Speed V=0.63 m/sec
Speed of rotation n=300 rpm (round per minute)
Die hold-down pressure P=29.4H; 53.9H; 122.5H Friction coefficient was determined by the calculation method under the formula:

$$f_{mp} = \frac{M_{mp}}{R \cdot P}$$

where: $M_{mp}$-friction torque; R-radius of the roller; P-loading
Wear of the roller was determined by the way of measuring.

DETAILED DESCRIPTION OF A PREFERRED EMBODIMENT

The invention may be implemented as follows. A mixture of powders of graphite, disulphide of molybdenum and the coppers is put in gauged rolls of a rolling mill for deriving granules. Granules in an amount of preferably from 6 to 24 mass % relative to the total composition are interleaved in a matrix mixture. The obtained blend is filled through a dispensing system on the surface of a steel leaf from low alloyed steel, prepared by abrasion and degreasing, and rolled between cylindrical rolls of the rolling mill. The obtained bimetal is baked in sintering furnace with protective gas.

Selection of components of the matrix and their proportions were determined according to the following criteria.

Application of copper as a basis for antifriction material was selected because of its high thermal conduction ensuring withdrawal of heat from the zone of a sliding friction, high antifriction properties, rust resistance resulting in formation of a protecting skin of oxides, moderate propensity to connect, sufficient flexibility and relatively low hardness ensuring fast processing. Moreover, powder of copper has sufficient compression features, baking capacity and rather high melting point.

The objective of increasing the content of iron in a matrix up to 18.8–25.0% is to obtain a strong steel skeleton, which increases hardness and endurance of a material by more than two times. As shown in the Table of FIG. 2, if the share of iron in a matrix is below 18.8%, it is impossible to derive a strong steel skeleton that would work well on attrition. If the share of iron exceeds 25.0%, it causes electrochemical corrosion of material due to a difference between the electrical potentials of copper and iron.

Phosphorus is inserted into the material to increase the bearing capacity of copper [10]. Improvement of mechanical characteristics as a result of doping phosphorus from 0.71 to 0.9% is caused by the labialising influence of a iron-phosphorous eutectic, which is formed at temperature over 707° C. and intensifies the process of contraction during baking [11]. Magnification of the content of phosphorus from 0.9% to 1.44% results in increase of the content of phosphide of copper ($Cu_3P$) in phosphide eutectic, which has much higher micro-hardness of copper [10;11].

Moreover, phosphorus improves mechanical characteristics of a steel skeleton of a matrix by a doping of a solid solution α-iron and heterogeneous matrix α-iron component due to dissolution of phosphorus in iron. Mutual dissolution of copper and phosphorus in ferrite hardens ferrite extensively. The copper hardens ferrite by 40 times and phosphorus by 690 times [12]. Hence, insertion of phosphorus augments hardness of a matrix, stabilizes contraction, simultaneously improving material's mechanical characteristics greatly [11–13] and raises rust resistance of a material [11]. In addition, the doping of a material by phosphorus increases diffusive processes occurring in α-phase [11].

At a content of phosphorus of less than 0.71%, hardening copper without considerable formation of a fluid phase is shown, i.e., there is no intensification of density incremental during baking and hardness characteristics do not increase. A content of phosphorus of over 1.44% causes magnification of the content of friable phases on boundaries of iron granules of a steel skeleton of a matrix, which worsens mechanical characteristics, i.e., hardness and toughness are diminished.

Graphite is an alloying element, which does not interact with copper and plays the role of solid lubricant [14]. Graphite is able to form and maintain a separating skin on the surface of counter-bodies [14]. The skin keeps restoring due to mechanical damages on certain points of a friction surface [15]. The graphite reduces a friction coefficient, increases its stabilization features with the help of the separating skin which is formed on the intermediate surface of a contacting pair, which reduces wear of a friction surface. Besides, the graphite together with phosphorus ensures deriving perlite and ferrite structure of a steel skeleton, hardened with phosphorus and copper, with predominance in structure of perlite. Copper-phosphorous layers border a perlite and ferrite granule that ensures formation of secondary structures at attrition, and, consequently, ensures a sharp heightening of endurance of a material.

Depending on the desired use for the material, the content of graphite in the matrix can range from 0.5 to 5%. A content of graphite of less than 0.5% causes local contraction of material and counter-body in the process of application [14], and a content of free graphite over 5% weakens the material [15].

At the same time, materials containing over 10% of graphite favor the formation of separating skin on the surface of material, thus preventing wear of contacting pair. Therefore, in the present invention, additional solid lubricant (graphite) is brought into the material in the form of granules, which may be obtained through continuous rolling in the shaped rolls of the rolling mill.

Thus, a content of 10.5–20.0% of graphite in the material can be reached by insertion of free graphite of 0.5–4.0% in a matrix and localized insertion of graphite in the form of granules in the amount of 10–16%. An amount of graphite in granules in the material of less than 10.5% may not ensure formation of separating skins; insertion of graphite in an amount over 16% may sharply reduce mechanical characteristics of the material.

It is preferred that the size of granules of any configuration in any direction be not less than 0.4 mm and not more than 1.6 mm. At sizes smaller than 0.4 mm, granules will take larger area and volume, thus diminishing the bearing capacity of a material and its endurance. At sizes of more than 1.6 mm, the low density results in concentrated stresses, which lower mechanical characteristics.

Disulphide of molybdenum is an alloying element, which considerably reduces a friction coefficient and promotes its stabilization due to magnification of hardness of separating skin by several times, reducing a wear of friction surfaces sharply.

It had been established experimentally that insertion of disulphide of molybdenum graphite granules in the amount 4.5–7.5% augments hardness of granules of graphite more than twice and augments hardness of separating films which are generated on a surface contacting pair in some times.

As concerns the materials requiring high electric conductivity, molybdenum disulfide is not added to the granules, otherwise the specific resistance of the material is increased.

Insertion of disulfide of molybdenum in granules prevents it from decomposition to molybdenum and sulfur.

Copper is added in granules to improve molding of granules and secure diffusive links of a matrix and granules implemented during baking. A content of copper in granules of more than 30% requires corresponding decrease of the share of graphite and disulphide of a molybdenum, so as to prevent formation of strong separating skins on an intermediate or friction surface of a contacting pair. Granules containing less than 15% of copper are very weak and feebly dressed in a matrix, which prevents formation of thick separating skins on surfaces of contacting pairs.

Appropriate contents of graphite, disulphide of molybdenum and copper in granules have been determined experimentally. Thus, these contents have been selected in the ranges 40–70, 15–30 and 15–30%, respectively. Proportions of graphite, disulphide of molybdenum and copper of 70, 15 and 15%, respectively, are an upper limit for forming granules without fracture.

Application of the antifriction material of the present invention is in particular in the production of liners, which are interposed in sliding bearing blocks. Work pieces made of antifriction material according to the present invention can weigh from 0.5 to 3000 kg and more.

REFERENCES

Scientific and Technical Literature and Documents

1. Vinohradov H. A., Semenov Y. N., Katrus O. A., Katashynskiy V. P. Rolling of Metal Powder.-M.: "Metallurgy", 1969, 382 p.
2. Fedorchenko I. M., Pushda L. I. Composite Baked Antifriction Materials-.: Naukova Dumka, 1980, 404p.
3. Kozlov V. F. and others. Structure and properties of baked antifriction material of bronze-graphite.-Powder metallurgy, 1981, N.6, pp. 48–53.
4. Patent 96038 (GDR) Verfaren zuz Steuerung der Eigenschaften von Reibkorpern-published 05.03.73.
5. Patent 5306 (Japan). Sliding contacts from copper alloys for current-collectors of high-speed electric trains.-Published 23.04.64.

6. Oho Tamutsy, Denpeku to Tetsudo, Elec, Light and Facile Railways", 1975, 25, N 10, s.32–36.
7. AMPERE-SECOND. 254093 (USSR), 1969
8. Patent 18-17684 (Japan), 1972
9. Patent 2049687 (Russia), "Materials for electric device", 1995.
10. Collection. Powder constructional materials. Kiev, Publishing House of an Academy of sciences of Ukraine, 1980y, p41.
11. Johnes V. D. Fundamentals of powder metallurgy // Properties and application of powder materials. -M.: Mir. -1965.-392p.
12. Holdstein M. I., Hrachyov S. V., Veskler Y. H. Special steel. -M.: Metallurgy. -1985.-408p.
13. Antsyferov V. N, Akymenko V. V. Baked alloy steels. -M.: metallurgy. -1983.-83ñ.
14. Bisson E. E., Johnson R. L., Anderson V. J. Application of solid lubricants, in particular of graphite, at temperature below 540 degrees C.-International conference on lubricant and wear of machines // London, 1957,-M.: Mashgiz, 1962, pp. 305–314 // translated by Petrusevich A. N.
15. Bisson E. E, Johnson R. L., Swekert M. A. Influence of surface solid skin on abrasion, wear and damage of surfaces of metals.-Same as previous pp.335–370.

What is claimed is:

1. A material comprising granules consisting essentially of graphite, disulphide of molybdenum and copper inserted in a matrix consisting essentially of phosphorus, iron, graphite and copper.

2. The material of claim 1, wherein about 10–16% of graphite, about 0–7.5% of disulphide of molybdenum and about 4.5–12% of copper relative to the mass of the material are contained as granules in the matrix.

3. The material of claim 1, wherein the material comprises the following amounts of components, in mass % relative to the mass of the material:

| | |
|---|---|
| Phosphorus | about 0.48–1.20 |
| Iron | about 12–20 |
| Disulphide of molybdenum | about 0–7.5 |
| Graphite | about 10.5–25.0 |
| Copper | Rest. |

4. The material of claim 3, wherein the matrix comprises the following amounts of components, in mass % relative to the mass of the matrix:

| | |
|---|---|
| Phosphorus | about 0.71–1.44 |
| Iron | about 18.8–25.0 |
| Graphite | about 0.78–5.0 |
| Copper | Rest. |

5. The material of claim 3, wherein the granules comprises the following amounts of components, in mass % relative to the mass of granules:

| | |
|---|---|
| Graphite | about 40–70 |
| Disulphide of a molybdenum | about 15–30 |
| Copper | about 15–30. |

6. The material of claim 1, wherein the amount of granules is between about 6 and about 24 mass % relative to the mass of the material.

7. The material of claim 1, wherein the granules have an average diameter in the range of about 0.4–1.5 mm.

8. An antifriction workpiece comprising the material of claim 1, wherein the material is formed as a layer on a steel substrate.

9. The workpiece of claim 8, wherein the steel substrate has a width in the range of about 1.5–25 mm.

* * * * *